(12) United States Patent
Kernchen et al.

(10) Patent No.: US 10,113,626 B2
(45) Date of Patent: Oct. 30, 2018

(54) POWER TRANSMISSION DEVICE

(71) Applicant: VOITH PATENT GMBH, Heidenheim (DE)

(72) Inventors: Reinhard Kernchen, Satteldorf (DE); Rainer Schips, Ellwangen (DE); Harmut Graf, Urbach (DE); Hans Schirle, Stimpfach (DE); Bernhard Ludas, Aalen (DE)

(73) Assignee: Voith Patent GmbH, Heidenheim (DE)

( * ) Notice: Subject to any disclaimer, the term of this patent is extended or adjusted under 35 U.S.C. 154(b) by 0 days.

(21) Appl. No.: 15/036,853

(22) PCT Filed: Nov. 13, 2014

(86) PCT No.: PCT/EP2014/074467
§ 371 (c)(1),
(2) Date: May 16, 2016

(87) PCT Pub. No.: WO2015/071349
PCT Pub. Date: May 21, 2015

(65) Prior Publication Data
US 2016/0290464 A1    Oct. 6, 2016

(30) Foreign Application Priority Data

Nov. 14, 2013 (DE) .................. 10 2013 223 213
Jul. 9, 2014 (DE) .................. 10 2014 213 295
Aug. 13, 2014 (DE) .................. 10 2014 216 066

(51) Int. Cl.
*F16H 47/08* (2006.01)
*F16H 41/26* (2006.01)
*F16H 61/56* (2006.01)

(52) U.S. Cl.
CPC ............. *F16H 47/08* (2013.01); *F16H 41/26* (2013.01); *F16H 47/085* (2013.01); *F16H 61/56* (2013.01)

(58) Field of Classification Search
CPC ........ F16H 47/08; F16H 47/085; F16H 61/56; F16H 41/26
USPC .................. 475/47, 49, 50, 53, 59
See application file for complete search history.

(56) References Cited

U.S. PATENT DOCUMENTS

| | | |
|---|---|---|
| 2,368,279 A | 1/1945 | Wemp |
| 2,640,680 A | 6/1953 | Altheide |
| 2,909,034 A | 10/1959 | Jandasek |
| 2,964,976 A | 12/1960 | Kelley |
| 3,073,182 A | 1/1963 | Harmon |
| 3,151,457 A | 10/1964 | Jandasek |
| 3,263,522 A | 8/1966 | General |
| 3,789,697 A | 2/1974 | Hobbs et al. |
| 4,117,745 A | 10/1978 | Yokoyama et al. |

(Continued)

FOREIGN PATENT DOCUMENTS

| | | |
|---|---|---|
| DE | 1450728 A1 | 6/1969 |
| DE | 2224636 A1 | 11/1972 |

(Continued)

*Primary Examiner* — Roger L Pang
(74) *Attorney, Agent, or Firm* — Laurence A. Greenberg; Werner H. Stemer; Ralph E. Locher

(57) ABSTRACT

A power transmission device includes a hydrodynamic converter. The blading of the pump wheel and/or turbine wheels includes at least one adjusting blade which can be actuated by an adjusting device, and/or at least one multi-element blade having at least one adjustable blade segment.

26 Claims, 4 Drawing Sheets

(56) References Cited

U.S. PATENT DOCUMENTS

| | | | | |
|---|---|---|---|---|
| 4,140,029 A | * | 2/1979 | Lee | F16H 47/085 |
| | | | | 475/35 |
| 4,726,255 A | | 2/1988 | Humpfer et al. | |
| 5,213,551 A | | 5/1993 | Antonov et al. | |
| 2003/0183470 A1 | * | 10/2003 | Johnson | F16D 31/06 |
| | | | | 192/3.29 |
| 2008/0101865 A1 | * | 5/2008 | Basteck | F03B 11/00 |
| | | | | 405/76 |
| 2014/0141916 A1 | | 5/2014 | Graf | |
| 2016/0290460 A1 | * | 10/2016 | Schirle | F16H 61/56 |

FOREIGN PATENT DOCUMENTS

| | | | | |
|---|---|---|---|---|
| DE | 3441877 A1 | | 5/1986 | |
| EP | 0833079 A2 | | 4/1998 | |
| FR | 1248173 A | * | 12/1960 | F16H 61/56 |
| JP | S52025973 A | | 2/1977 | |
| JP | S52169681 U | | 12/1977 | |
| JP | H0641785 B2 | | 6/1994 | |
| WO | 9113275 A1 | | 9/1991 | |
| WO | WO2012143123 A1 | | 10/2012 | |

\* cited by examiner

POWER TRANSMISSION DEVICE

BACKGROUND OF THE INVENTION

Field of the Invention

The invention relates to a power transmission device from an input shaft, which is connected at least indirectly to a drive unit, in particular a constant speed drive unit, to an output shaft, which is connected at least indirectly to a work machine, in particular a work machine with a variable speed.

Devices for power transmission for driving a variable-speed work machine are already known from the prior art in various embodiments. The embodiment according to DE 34 41 877 A1 consists of a transmission comprising planetary gear units, wherein the power is transmitted via a mechanical power component and a hydrodynamic power component. The hydrodynamic power component passes via a hydrodynamic converter in the form of a corotating converter and the speed thereof can be regulated by the converter through adjustment of the blading of the stator. This power component is recombined with the mechanically transmitted power component in a planetary gear unit and thus drives the work machine at the desired speed even though the drive unit driving the power transmission unit at the input shaft runs at a constant speed. Based on this structure, DE 10 2008 034 607 describes a similar structure, which replaces the hollow shaft with coupling shafts extending parallel to the central axis of the power transmission unit.

In contrast, a power transmission device which has a hydrodynamic counterrotating converter instead of a hydrodynamic corotating converter is already known from document WO2012143123 A1. Although this is somewhat less good in terms of efficiency than a corotating converter, it allows a very simple and compact construction of the device. Here, provision is made for the first element to be the planet carrier of the planetary gear unit, while the second element is the sun wheel of the planetary gear unit and the third element is the annulus of the planetary gear unit. This construction, in which the annulus is connected directly to the output shaft or via a further gear unit, preferably a spur gear unit, and in which the hydrodynamic power component is input via the sun wheel, has the decisive advantage that the planetary gear unit can be made very compact by virtue of the advantageous speeds.

In power transmission devices between a driving machine and a machine to be driven, in particular a work machine, hydrodynamic converters have to meet various requirements. Important criteria are achievable efficiency, power consumption behavior and modification of the torque and speed at the output, i.e. at the turbine. In the case of the known power transmission devices, the operating states are affected by a setting of the stator and/or the degree to which the hydrodynamic converter is filled with working medium. However, it has been found that it has not yet been possible to achieve the desired results and the required operating range in the abovementioned power transmission devices with or without adjustment of the stator.

BRIEF SUMMARY OF THE INVENTION

It is the underlying object of the invention to further develop a power transmission device of the type stated at the outset for at least indirect coupling to a work machine in such a way that said device makes it possible to meet the requirements as regards interaction with a work machine in an optimum manner, while the intention is to achieve freedom in the open-loop and/or closed-loop control of the power consumption with, at the same time, a compact construction and with very good efficiency.

The solution according to the invention is characterized by the features as claimed. Advantageous embodiments are given in the dependent claims.

A device according to the invention for power transmission from an input shaft, which is connected at least indirectly to a drive unit, in particular a drive unit with a constant speed, to an output shaft, which is connected at least indirectly to a work machine, in particular a work machine with a variable speed, having a hydrodynamic converter comprising at least one pump wheel, one turbine wheel and one stator having blading, which form a working space that can be filled with operating medium;

a superposition gear unit comprising at least one planetary gear unit, comprising the elements annulus, sun wheel and a planet carrier with a plurality of planet wheels as elements of the planetary gear unit, wherein the pump wheel and/or the input shaft is/are coupled to a first element of the planetary gear unit, a second element of the planetary gear unit is coupled at least indirectly to the at least one turbine wheel, and the output shaft is connected to a third element of the planetary gear unit, is characterized in that the blading of the pump wheel and/or turbine wheel comprises at least one adjustable blade, which can be actuated by means of an actuating device, and/or at least one multi-element blade having at least one adjustable blade segment.

A hydrodynamic converter is taken to mean a device for speed/torque conversion. This comprises at least three blade wheels, which form a working space that can be filled with operating medium and which deflect the flow of an operating medium. The blade wheels can each be of single- or multi-part design.

In particular, the couplings for the bladed parts of the converter can be made directly or via shafts or hollow shafts coupled or connected for conjoint rotation to the elements of the planetary gear unit and/or with the interposition of further transmission elements.

According to a particularly advantageous embodiment, adjustable blades are provided on the pump wheel, thereby making it possible to achieve improved efficiency and broadening of the characteristic map.

The solution according to the invention with adjustment of at least individual adjustable blades and/or of adjustable blade segments on the pump wheel and/or turbine wheel offers the advantage that the input power can be controlled and that the possible operating range of the converter within the power transmission device is enlarged.

According to a first basic embodiment of the power transmission device, the converter in the power transmission device according to the invention can be embodied as a corotating converter. In this case, the pump wheel and the turbine wheel rotate in the same direction.

The possibilities for coupling with the planetary gear unit are obtained as follows from the association of the individual components:

a) the first element of the planetary gear unit is formed by the annulus, the second element of the planetary gear unit is formed by the planet carrier and the third element of the planetary gear unit is formed by the sun wheel. The turbine wheel is then connected to the planet carrier either directly or via a reversing mechanism.

b) The first element of the planetary gear unit is formed by the annulus, the second element of the planetary gear unit is formed by the sun wheel and the third element of the planetary gear unit is formed by the planet carrier.

c) The first element of the planetary gear unit is formed by the sun wheel, the second element of the planetary gear unit is formed by the annulus and the third element of the planetary gear unit is formed by the planet carrier.

d) The first element of the planetary gear unit is formed by the sun wheel, the second element of the planetary gear unit is formed by the planet carrier and the third element of the planetary gear unit is formed by the annulus.

e) The first element of the planetary gear unit is formed by the planet carrier, the second element of the planetary gear unit is formed by the annulus and the third element of the planetary gear unit is formed by the sun wheel.

f) The first element of the planetary gear unit is formed by the planet carrier, the second element of the planetary gear unit is formed by the sun wheel and the third element of the planetary gear unit is formed by the annulus.

In a second particularly advantageous basic embodiment of the power transmission device, the converter is embodied as a counterrotating converter. The same possibilities for coupling with the planetary gear unit are obtained as those described under a) to f). In a particularly advantageous design embodiment, the first element of the planetary gear unit is formed by the planet carrier, the second element of the planetary gear unit is formed by the sun wheel and the third element of the planetary gear unit is formed by the annulus of the planetary gear unit. Owing to its design construction, the use of a counterrotating converter allows a very simple and compact construction of the power transmission device itself and of the structural integration of the actuating device.

Here, the construction in which the annulus is connected to the output shaft directly or via a further gear unit, preferably a spur gear unit, and in which the hydrodynamic power component is input via the sun wheel has the decisive advantage that the planetary gear unit can be made very compact by virtue of the advantageous speeds. Overall, the device thus acquires a very compact construction which can dispense with a coupling sleeve. It can furthermore dispense with additional stationary gear units in the form of planetary gear units and can thus be made very small, compact with a small number of components and accordingly simple and economical to produce and assemble. According to an advantageous development, the construction can be made with precisely one planetary gear unit, thus making it possible to dispense with further, relatively expensive planetary gear units.

According to an advantageous development of the device according to the invention, it is furthermore envisaged that the turbine of the hydrodynamic counterrotating converter is connected to the sun wheel of the planetary gear unit by means of a hollow shaft, and the input shaft, which passes through the hollow shaft, is connected to the planet carriers on the side which faces away from the counterrotating hydrodynamic converter. This allows a very compact construction, which can be implemented in a very space-saving manner. The hollow shaft according to this construction is of relatively small diameter and is far less expensive and complex than the coupling sleeve in the construction according to the prior art, for example. As regards the adjustability of the adjustable blades and/or of the adjustable blade segments, there are a number of possibilities. The individual adjustment versions can be described and, where applicable, distinguished by at least one of the following parameters:

way in which the adjusting force/adjusting torque is produced introduction of the adjusting force/adjusting torque, in particular direction manner of control of the adjustable blades and/or adjustable blade segments Fundamentally, a distinction can be drawn between axial adjustment of the adjustable blades (in particular parallel to the axis of rotation of the pump wheel and/or turbine wheel) and/or adjustable blade segments and turning about a theoretical pivoting axis. The terms "pivoting axis" and "axis of rotation" should be understood functionally and are not restricted to a specific design embodiment. As regards the pivoting axis of the blades, the components used to implement these can be formed by journals, pins or other rotationally symmetrical components. The components used to implement the axis of rotation of the pump wheel and/or of the turbine wheel can be formed by the pump wheel itself, a component connected for conjoint rotation to the pump wheel, in the form of a shaft, hollow shaft or some other rotationally symmetrical component.

In terms of design, the actuating device comprises an actuator, which is connected to the adjustable blade and/or at least one adjustable blade segment of a multi-element blade by a transmission mechanism, wherein the adjusting force applied by means of the actuator is introduced into the transmission mechanism in accordance with one of the following possibilities or with a combination of these:

in the axial direction, based on the axis of rotation of the pump wheel or turbine wheel in the circumferential direction, about the axis of rotation of the pump wheel or turbine wheel.

According to the first basic variant, the pump wheel or turbine wheel comprises, for this purpose, a pump-wheel or turbine-wheel shell. The at least one adjustable blade and/or at least one adjustable blade segment of a multi-element blade are/is mounted in the blade-wheel shell so as to be movable in the axial direction parallel to the axis of rotation of the pump wheel or turbine wheel. This embodiment offers the advantage of the removability of at least individual blades or all the blades or of blade segments from the work circuit.

In contrast, a second basic variant is characterized in that the pump wheel and/or turbine wheel comprise/comprises a blade-wheel shell, and the at least one adjustable blade and/or at least one adjustable blade segment of a multi-element blade are/is mounted in the blade-wheel shell so as to be pivotable about a theoretical axis. In the case of these pivoted blades or pivotable blade segments, the angular position thereof relative to an initial position that can be described by the extent in the radial direction can be varied by turning about a defined pivoting axis. The initial position describes a first functional position, while each further position of deflection from the initial position describes a further functional position. According to a particularly advantageous embodiment, the pivoting axis can lie in the plane of the blade but also outside said plane. This type of adjustability offers the advantage of freedom in the adjustment of inlet flow conditions at the pump wheel or turbine wheel.

The actuating device in both basic embodiments is preferably arranged outside the working space and adjacent in the axial direction to the respective blade wheel—pump wheel and/or turbine wheel. This offers the advantage of easy access and, particularly in the case of a counterrotating converter and hydraulic generation of the actuating force, also simple connection to a pressure sink/pressure source as regards the method of generating the required actuating force.

In a development, the actuator is embodied as a single actuator or as a combination taken from the group of actuators which is mentioned below:
 mechanical actuator
 hydraulic actuator
 pneumatic actuator
 electronic actuator Hydraulic actuators are preferably used since these can also be supplied in a simple manner via the operating medium supply system of the converter and can be integrated into said system and thus make it possible to eliminate an expensive means of providing a dedicated pressure medium source/pressure medium sink.

As regards the design embodiment of the actuators and of the transmission mechanisms, there are a number of possibilities. Here, the embodiment of the transmission mechanism depends substantially also on the design of the actuator and the method of adjustment—axial or pivoting—of the adjustable blades.

In a particularly advantageous embodiment of an actuating device with the adjusting force being introduced in the circumferential direction around the axis of rotation, the actuator has ring elements, which are each arranged coaxially with respect to the axis of rotation of the pump wheel, wherein a first ring element is connected to the at least one adjustable blade and/or at least one adjustable blade segment to transmit an actuating force or an actuating torque by means of the transmission mechanism, and the first ring element can be turned relative to a second ring element in the circumferential direction of the input shaft. Here, in a particularly advantageous manner, the first and the second ring element form at least two pressure chambers, which are arranged in the circumferential direction of the input shaft and can each be subjected to pressure for the relative rotation between the first and second ring element. By means of the adjustments of the pressure ratios in the oppositely acting pressure chambers, particularly finely graded turning of the adjustable blades and/or adjustable blade segments is possible.

In this case, the transmission mechanism preferably has an adjusting ring, which is arranged coaxially with respect to the input shaft and is connected for conjoint rotation to the first ring element, wherein the adjusting ring is coupled to the at least one adjustable blade and/or adjustable blade segment for the transmission of an actuating force or of an actuating torque. The adjusting ring can be embodied in accordance with one of the possibilities mentioned below:
 the adjusting ring has at least one cam, which interacts with a crank mechanism, in particular with a radially arranged lever element, wherein the crank mechanism is coupled to the adjustable blade
 the adjusting ring has external toothing, which meshes with the external toothing of a journal of the adjustable blade, which extends parallel to the central axis of the adjusting ring.

Both possibilities offer the advantage that no force deflection is required and that the actuating device can be of very compact configuration, it preferably also being possible for the actuator and the transmission mechanism to be arranged in one axial plane.

In a particularly compact construction, the actuator and the transmission mechanism are formed by one module.

If, with an alternative embodiment of the actuating device, the adjusting force is introduced into the transmission mechanism parallel to the axis of rotation of the pump wheel, the actuator has at least one actuating piston, which can be moved in the axial direction and is arranged coaxially or eccentrically with respect to the axis of rotation of the pump wheel, wherein the actuating piston is connected to the at least one adjustable blade and/or the at least one adjustable blade segment in order to transmit an actuating force or an actuating torque by means of the transmission mechanism and can be moved in the axial direction relative to the pump wheel.

In this case, the transmission mechanism can be formed by an adjusting ring coupled to or embodied integrally with the actuating piston.

For all the abovementioned adjusting devices and also those which are described below, it is the case that the individual adjustable blades and/or adjustable blade segments can be controlled either individually and/or in groups and/or jointly by means of these measures. The latter possibility offers the advantage of a relatively low design and control outlay, while the first-mentioned possibility makes possible very accurate and finely graded adjustment. Valve devices are conceivable as devices for control, for example.

In addition, the stator can be of adjustable design in all the embodiments, in particular comprising adjustable blades or at least one adjustable blade segment.

The power transmission device according to the invention can be employed, in particular, for use in drive trains between a driving machine that can be operated at a constant speed, in particular an electric motor or turbine (e.g. gas or steam turbine) and a variable-speed work machine since the adjustability enables the arrangement to be adapted in an optimum manner to the requirements of this use.

A particularly advantageous embodiment, described below, of an actuating or adjusting device with the adjusting force being introduced parallel to the axis of rotation of the pump wheel has a sleeve, an outer cylinder and an axially movable sliding element, which are each arranged coaxially with respect to the drive shaft. In this arrangement, the sliding element connects the sleeve and the outer cylinder in such a way that the sleeve can be turned relative to the outer cylinder in the circumferential direction of the drive shaft by an axial movement of the sliding element. The sleeve is connected to the at least one adjustable blade in order to transmit an actuating force or an actuating torque, in particular by a deflection device. This has the advantage that mechanical components that are subject to only a small amount of wear are required to produce an actuating force or an actuating torque. In general, this is achieved by virtue of the fact that the actuating torque is produced substantially by a superimposed translational/rotary motion of the sliding element. Specifically, this is achieved by virtue of the fact that a sleeve, an outer cylinder and a sliding element are provided, forming the actuating device. The sleeve and the outer cylinder can be turned relative to one another in the circumferential direction of the drive shaft. When the actuating device is activated, the sliding element performs a superimposed translational/rotary motion. The translational motion of the sliding element represents an axial movement of the sliding element along the drive shaft, while the sliding element simultaneously also rotates around said shaft. By means of this superimposed translational/rotary motion of the sliding element, the relative rotation between the sleeve and the outer cylinder is produced. The sleeve is coupled to the adjustable blade by the deflection device. The actuating torque or actuating force produced by the relative rotation of the sleeve with respect to the outer cylinder is introduced by the deflection device into the adjustable blade and moves the latter into the intended adjustment position.

The sleeve, the sliding element and the outer cylinder are each arranged coaxially with respect to the drive shaft, leading to a compact construction of the actuating device. The sleeve can preferably be turned hydraulically indirectly by means of the sliding element.

In order to convert the actuating force in this alternative embodiment of the actuating device as effectively as possible and over a short distance into a turning motion of the adjustable blade, the sliding element is assigned a device for applying an actuating force, wherein the respective connection between the sliding element and the outer cylinder and between the sliding element and the sleeve is designed and arranged in such a way that the effects of the connections are superimposed during the transmission of an actuating force, wherein the individual connection between the sliding element and the outer cylinder and/or between the sliding element and the sleeve is in each case made directly or via further intermediate elements.

The connection between the sliding element and the outer cylinder and the connection between the sliding element and the sleeve are preferably each designed as toothing, in particular as a thread.

According to a first variant of the connections, in each case one of the connections of the sliding element with the connection components—the connection between the sliding element and the outer cylinder or the connection between the sliding element and the sleeve—is embodied as a thread and the other connection in each case—the connection between the sliding element and the sleeve or the connection between the sliding element and the outer cylinder—is embodied as spur toothing with the tooth flanks aligned parallel to the axis of rotation of the converter.

In a particularly advantageous second variant, in each case one of the connections of the sliding element to the connection components—the connection between the sliding element and the outer cylinder or the connection between the sliding element and the sleeve—is embodied as a thread and the other connection in each case—the connection between the sliding element and the sleeve or the connection between the sliding element and the outer cylinder—is embodied as helical toothing with the tooth flanks aligned at an angle to the axis of rotation of the converter. In this case, the thread and the helical toothing are characterized by a common basic directional component. Through selection of the pitch, the turning motion of the sliding element which occurs during the axial motion owing to the connection to the outer cylinder is transmitted to the sleeve either analogously or with a transmission ratio. In a particularly advantageous embodiment, both, i.e. the connection between the sliding element and the outer cylinder and the connection between the sliding element and the sleeve, are embodied as helical toothing with the tooth flanks aligned at an angle to the axis of rotation of the converter. Embodiment as helical toothing can be produced in a particularly simple manner.

The coaxial arrangement of the sleeve, of the sliding element and of the outer cylinder with respect to the drive shaft allows a simple and compact construction of the actuating device and thus of the converter, thereby reducing both the outlay in terms of construction and the risk of wear.

In a preferred variant of this second alternative embodiment of the actuating device, the outer cylinder is connected for conjoint rotation to the drive shaft and takes the sliding element and the sleeve along during a rotation of the drive shaft. This embodiment is suitable particularly for adjusting the pump blade because the sleeve, the sliding element and the outer cylinder rotate at the same speed as the pump wheel. The position of the adjustable blade is defined by setting the angular position between the sleeve and the outer cylinder. Since the sleeve, the sliding element and the outer cylinder rotate with the drive shaft, it is only during the adjustment process that there is a relative motion in the circumferential direction of the drive shaft between the sleeve and the outer cylinder due to the superimposed translational/rotary displacement of the sliding element. Before and after the adjustment process, there is no relative motion between the drive shaft, the sleeve, the sliding element and the outer cylinder, and therefore the abovementioned elements together form a rotating unit.

In another variant of the alternative embodiment of the actuating device, the sleeve and the outer cylinder form two pressure chambers, which are arranged in the axial direction of the drive shaft, are separated from one another by the sliding element and can each be subjected to pressure, such that the sliding element can be moved axially along the drive shaft.

The sliding element is actuated hydraulically, in particular hydraulically in both axial directions of the sliding element. Mechanical actuating elements, e.g. return springs, are thus avoided. The return or, in general terms, the change in position of the sliding element is accomplished hydraulically. By means of the two pressure chambers, an axial movement of the sliding element and, coupled with this, the relative motion between the sleeve and the outer cylinder in the circumferential direction of the drive shaft, can be performed in both circumferential directions. Another advantage of this embodiment is the infinitely variable adjustability of the adjustable blade.

By setting suitable pressures in the pressure chambers, it is possible to hold an axial position of the sliding element and, associated with this, an angular position between the sleeve and the outer cylinder and thus a desired angle of attack of the adjustable blade during the operation of the converter.

In general, the sliding element can be interpreted as an axially movable annular piston, the stroke of which acts axially along the drive shaft.

In another preferred variant of the second alternative embodiment of the actuating device, the outer cylinder or the sleeve has a coupling element, which is connected to the sliding element in such a way that an actuating force or an actuating torque can be introduced into the sleeve by means of the axial motion of the sliding element. This provides a simple and robust embodiment, by means of which the hydraulically produced axial motion of the sliding element introduces an actuating force or an actuating torque into the sleeve, causing the sleeve to turn relative to the drive shaft.

The coupling element preferably comprises an internal thread on the outer cylinder, which is in engagement with an external thread on the sliding element. A translational movement of the sliding element relative to the outer cylinder is thereby made possible, wherein the sliding element is turned by the internal thread on the outer cylinder. The internal thread can be understood as a nut thread.

The rotary motion of the outer cylinder which is produced by the drive shaft is transmitted by the thread to the sliding element, with the result that the latter is taken along by the outer cylinder. Other coupling elements that, on the one hand, allow transmission of the rotary motion of the outer cylinder to the sliding element and, on the other hand, allow the superimposed translational/rotary motion of the sliding element are conceivable.

As an alternative, the coupling element can comprise an external thread on the sleeve, which is in engagement with an internal thread on the sliding element. A translational movement of the sliding element relative to the sleeve is thereby made possible, wherein the sleeve is turned relative to the sliding element or to the drive shaft by the thread. Other coupling elements by means of which the rotational motion of the sleeve can be coupled to the translational motion of the sliding element are conceivable.

Moreover, the sliding element has toothing, which is in engagement with complementary toothing on the sleeve or the outer cylinder.

The outer toothing on the sleeve is preferably embodied as spur toothing or as helical toothing. The helically toothed embodiment leads to an increase in the angle of rotation since the pitch of the toothing and the pitch of the thread are added. Both the embodiments are particularly suitable for the nut thread on the outer cylinder.

In general, this complementary toothing can comprise a single tooth, which is firmly connected to the sleeve or the outer cylinder and engages in a corresponding guide groove in the sliding element. This guide groove in the sliding element transmits both the rotary driving motion of the drive shaft and the relative adjustment motion of the sliding element during the adjustment process. By means of the guide groove, it is thus possible for the single tooth to be guided during the axial movement of the sliding element and, at the same time, for the actuating force or actuating torque to be transmitted to the sleeve in any position of the sliding element. Instead of a single tooth, the toothing can comprise a plurality of teeth, e.g. a toothed ring segment or a complete toothed ring. The toothing in the components in engagement (sliding element and sleeve or outer cylinder) is of complementary design.

As an alternative, the single tooth can be arranged on the sliding element and engage in a guide groove in the sleeve or the outer cylinder. Instead of a single tooth, the toothing can comprise a plurality of teeth, e.g. a toothed ring segment or a complete toothed ring. The toothing in the components that are in engagement (sliding element and sleeve or outer cylinder) is of complementary design.

In the case of the spur-toothed embodiment, the guide groove extends parallel to the central axis of the drive shaft. In the case of the helically toothed embodiment, the guide groove is adapted accordingly.

The outer cylinder can form a cylindrical housing in which the sliding element and the sleeve are arranged. A particularly compact embodiment of the actuating device is thereby achieved.

In this arrangement, the outer cylinder represents the outer boundary of the pressure chambers, as seen from the drive shaft. The inside of the pressure chambers can be bounded both by the drive shaft itself and by the sleeve. Here, the two pressure chambers each form a radially symmetrical pressure space, wherein these are arranged coaxially with respect to the drive shaft. The two pressure chambers are separated from one another by the sliding element that can be moved in the axial direction, thus forming pressure chambers with a variable volume. Here, the sliding element in each case forms one end of the two radially symmetrical pressure chambers. The respective opposite end of the two pressure chambers is formed by the outer cylinder.

By subjecting the pressure chambers to different pressures, the sliding element can be moved axially in both directions along the drive shaft. By virtue of the coupling element between the outer cylinder and the sliding element, the axial movement of the sliding element causes an additional rotary motion of the sliding element relative to the outer cylinder. By virtue of the toothing between the sliding element and the sleeve, this relative motion in the circumferential direction with respect to the drive shaft allows adjustment of the adjustable blade in different directions.

The sliding element and/or the outer cylinder and/or the sleeve can have radially arranged sealing elements to seal off the pressure chambers.

In the actuating device according to the second alternative embodiment, in particular in the outer cylinder, bores are furthermore preferably formed, these opening into the pressure chambers, in particular in the region of the outside diameter, to allow the application of pressure. The formation of the bores in the outer cylinder has the advantage that the feed channels connected fluidically to the bores formed in the outer cylinder can be formed in the drive shaft. The opening of the bores in the region of the outside diameter of the pressure chambers has the advantage that scavenging of the pressure chambers is thereby achieved. Any contaminants adhering to the outside diameter, which accumulate there during operation, are removed or avoided through the introduction of the working medium in the region of the outside diameter.

The formation of the feed channels in the drive shaft can be accomplished by means of a rotary union, for example. The rotary union can, for example, be a hydraulic sleeve in which channels connected fluidically to the bores in the outer cylinder are formed. The hydraulic sleeve is connected for conjoint rotation to the drive shaft.

In a particularly preferred embodiment, the deflection device has an adjusting ring, which is arranged coaxially with respect to the drive shaft and is connected for conjoint rotation to the sleeve. The adjusting ring is coupled to the at least one adjustable blade for the transmission of an actuating force or of an actuating torque. The adjusting ring contributes to the compact construction of the converter since, like the actuating device, it is arranged coaxially with respect to the drive shaft. By virtue of the connection of the adjusting ring for conjoint rotation to the sleeve, any mechanical coupling components are avoided. On the contrary, the actuating torque required for the adjustment of the adjustable blade is introduced into the adjusting ring directly by the sleeve. The connection for conjoint rotation between the adjusting ring and the sleeve can be achieved by means of a material joint, such as a welded joint, or by means of positive or nonpositive joints, for example.

In another embodiment, the coupling of the adjusting ring to the adjustable blade can be accomplished by virtue of the fact that the adjusting ring has at least one cam or at least one driver, interacting, in particular, with a radially arranged lever element and/or crank mechanism. The lever element and/or the crank mechanism are/is coupled to the adjustable blade. Control of the adjustable blade by a crank mechanism is known per se, and therefore reference can be made in this regard to already existing designs. As compared with the prior art, the formation of the cam or driver on the adjusting ring has the advantage that no special mechanical components are required to introduce force into the crank mechanism. On the contrary, the crank mechanism is actuated directly by the driver. The crank mechanism preferably forms a radially arranged lever element, which converts the rotary motion of the adjusting ring into a superimposed translational/rotary motion. By virtue of the coupling of the lever element to the adjustable blade, the actuating movement is achieved in a manner known per se.

In an alternative embodiment, the adjusting ring has external toothing, which meshes with the external toothing of a journal of the adjustable blade. The journal extends parallel to the central axis of the adjusting ring. This embodiment has the advantage that the rotary motion of the adjusting ring is converted directly into a rotary motion of the adjustable blade. The number of mechanical components is thereby further reduced.

In all the embodiments, the adjustable blade can comprise a pivoted blade or a multi-element blade having at least one pivoted segment. Pivoted blades and multi-element blades are known per se, wherein a pivoted blade signifies a one-piece adjustable blade which can be adjusted as a whole. In the case of a multi-element blade, one blade segment is fixed. At least one further blade segment is pivotable. The drive for the pivotable blade segment is provided by the actuating device.

The preferred embodiment, according to which a sensor for detecting the angular position between the sleeve and the outer cylinder is provided, is particularly suitable for systems in which the input power is subjected to closed-loop control. The angle signal output by the sensor is used for this purpose.

The actuating device according to the second alternative embodiment has an axially movable sliding element, a sleeve and an outer cylinder with concentric arrangement. The sleeve is connected at least to an adjustable blade of the converter for the transmission of an actuating force or of an actuating torque, in particular by means of a deflection device. For the actuating motion of the adjustable blade, the sleeve can be turned relative to the outer cylinder in the circumferential direction of the drive shaft by means of an axial motion of the sliding element. For the other advantages of such an actuating device, attention is drawn to the embodiment in connection with the hydrodynamic converter.

BRIEF DESCRIPTION OF THE SEVERAL VIEWS OF THE DRAWING

The solution according to the invention is explained below by means of figures. In said figures, the following is shown in particular.

DESCRIPTION OF THE INVENTION

Figure 1:
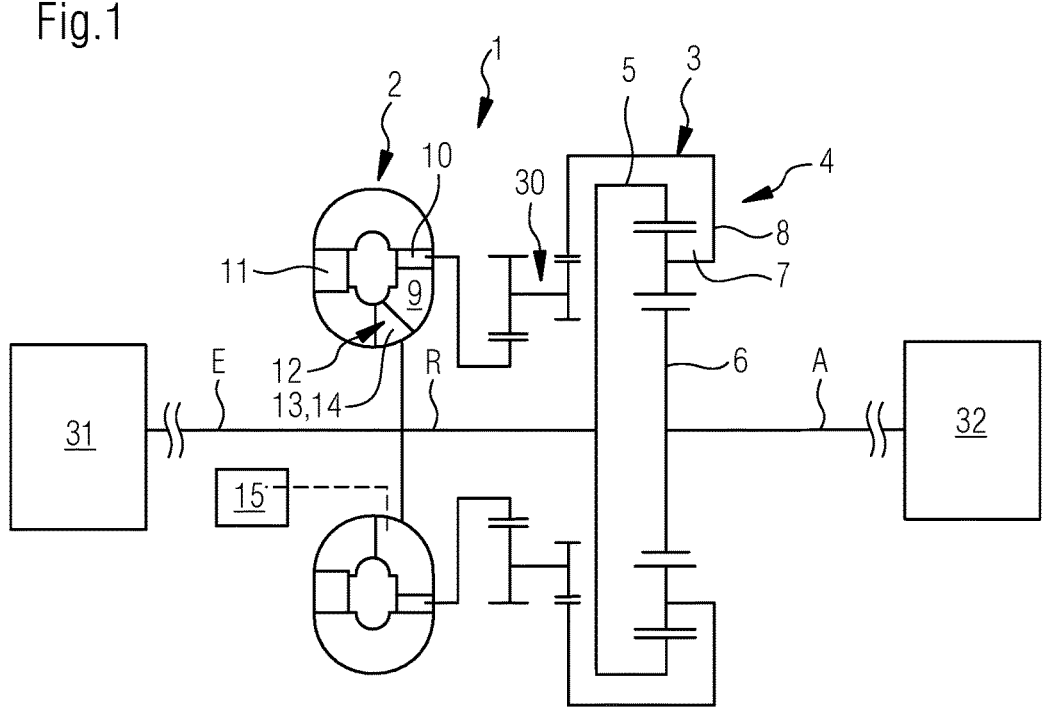
FIG. 1 shows a first basic embodiment of a power transmission device having a corotating converter, by way of example.
Figure 2:
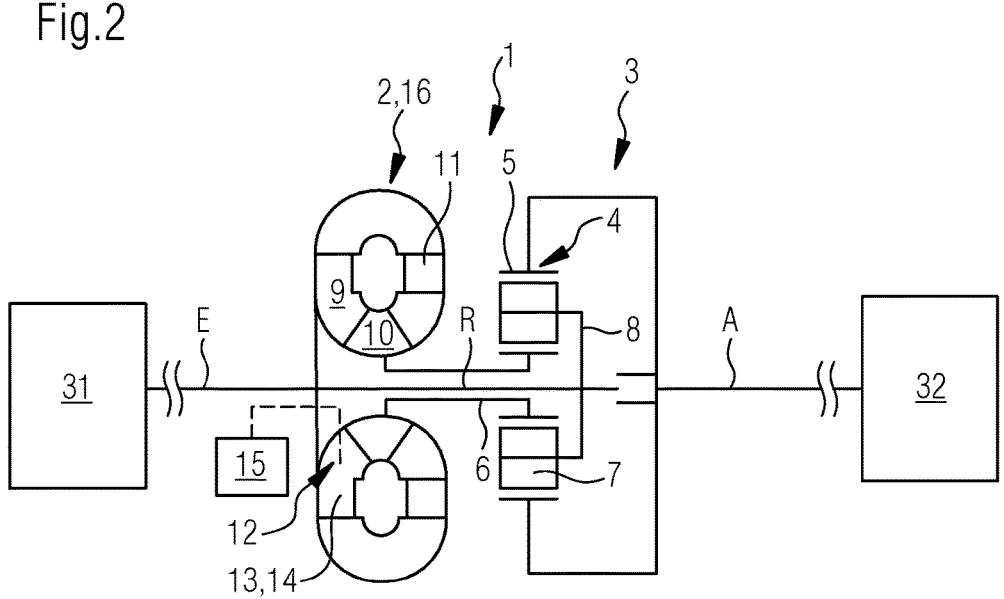
FIG. 2 shows a second basic embodiment of a power transmission device having a counterrotating converter, by way of example.

FIGS. 1 and 2 illustrate, in schematically simplified representation, the basic construction of a power transmission device 1 embodied in accordance with the invention for power transmission from an input shaft E connected at least indirectly to a drive unit 31 to an output shaft A connected at least indirectly to a unit to be driven, in particular a work machine 32, according to a first and a second basic embodiment in an advantageous design with adjustability of the pump wheel blades. Here, "at least indirectly" means either directly or via further interposed components, which can also include devices for speed/torque conversion.

The power transmission device 1 comprises a hydrodynamic speed/torque converter, referred to below for short as a hydrodynamic converter 2, and a superposition gear unit 3, comprising at least one, in the illustrated embodiment precisely one, planetary gear unit 4 having at least one annulus 5, one sun wheel 6 and one spider 8 carrying the planet wheels 7. The planet wheels 7 are mounted rotatably on the spider 8. The hydrodynamic converter 2 comprises at least one pump wheel 9, one turbine wheel 10 and one stator 11. Other embodiments are likewise conceivable.

The converter 2 according to a first basic embodiment is embodied as a single-phase hydrodynamic converter or corotating converter, that is to say that the pump wheel 9 and the turbine wheel 10 rotate in the same direction. Single-stage and multistage embodiments are also conceivable. In the case of a multistage embodiment, individual main members of the converter 2, which are formed by the pump wheel 9 or the turbine wheel 10, can consist of a plurality of blade rings, between which a main member or a blade ring of another main member is arranged.

In the embodiment shown in FIG. 1, by way of example, the pump wheel 9 is coupled at least indirectly for conjoint rotation to the annulus 5 of the planetary gear unit 4, while the turbine wheel 10 is connected to the spider 8 via a reversing stage, in particular an idler wheel 30. The hydrodynamic converter 2 and the planetary gear unit 4 are arranged coaxially with respect to one another.

The pump wheel 9 has blading 12. This blading is formed by a plurality of blades. According to the invention, the blading 12 has at least one or a plurality of adjustable blades 13 and/or at least one, preferably a plurality of, multi-element blades having at least one adjustable blade segment 14. The adjustment of the blades 13 and/or blade segments 14 can be accomplished in various ways. An actuating device 15 is preferably assigned to the hydrodynamic converter 2 for this purpose. This is indicated only schematically here and, as regards its operation, is shown as coupled to the adjustable blades 13 or blade segments 14. As regards the specific structural embodiment, there are a number of possibilities.

FIG. 2 illustrates a second basic embodiment of a power transmission device 1 designed in accordance with the invention, in which the converter 2 is embodied as a counterrotating converter 16. Apart from the converter 2, this too comprises a superposition gear unit 3 comprising at least one planetary gear unit 4, in this case precisely one planetary gear unit 4. Here too, the hydrodynamic converter 2 and the superposition gear unit 3 are arranged between an input shaft E, which can be connected at least indirectly to a driving machine, and an output shaft A, which can at least be connected to a work machine. In analogy to the embodiment in FIG. 1, the planetary gear unit 4 comprises at least one annulus 5, one sun wheel 6, planet wheels 7 and one planet carrier or spider 8 carrying these. The counterrotating converter 16 is characterized by the fact that the pump wheel 9 and the turbine wheel 10 rotate in opposite directions. In this case, the turbine wheel 10 can be arranged adjacent to the pump wheel 9 in the axial direction. Embodiments with a radial arrangement are also conceivable. The converter 2 furthermore comprises at least one stator 11. The stator 11 is preferably fixed but can also be rotatably mounted.

Here, connection to the planetary gear unit 4 is made in such way that the pump wheel 9 of the hydrodynamic converter 2 is coupled to the spider 8 of the planetary gear unit 4 and to the input E, while the turbine wheel 10 is connected at least indirectly, preferably directly, to the sun wheel 6 of the planetary gear unit. Here too, the blading 12 of the pump wheel 9 comprises at least one, preferably a plurality of adjustable blades 13 or adjustable blade segments 14. For this purpose, the blading 12 of the pump wheel 9 is assigned at least one actuating device 15 for adjusting the at least one or a plurality of blades and/or individual blade regions.

In the embodiment as a counterrotating converter 16, the actuating device 15 is preferably arranged outside the working space formed by the blade wheels 9, 10, 11 and adjacent to the pump wheel 9 when viewed in an axial direction. As regards the actuating devices 15 to be designed for the embodiment according to FIGS. 1 and 2, there is a large number of possibilities. They can be embodied in a very wide variety of different ways and differ from one another in the implementation of a number of subfunctions, which include the method of generating the adjusting force, the direction in which the adjusting force is introduced, the manner of the adjustment of the individual adjustable blade or of the adjustable blade segment and the type of blade control. These possibilities are reproduced by way of example in a table in FIG. 3. As regards the manner of control, it is possible here to distinguish between central control, i.e. adjustment of all the adjustable blades and/or adjustable blade segments, and individual or group control of the adjustable blades and/or adjustable blade segments.

Figure 3:
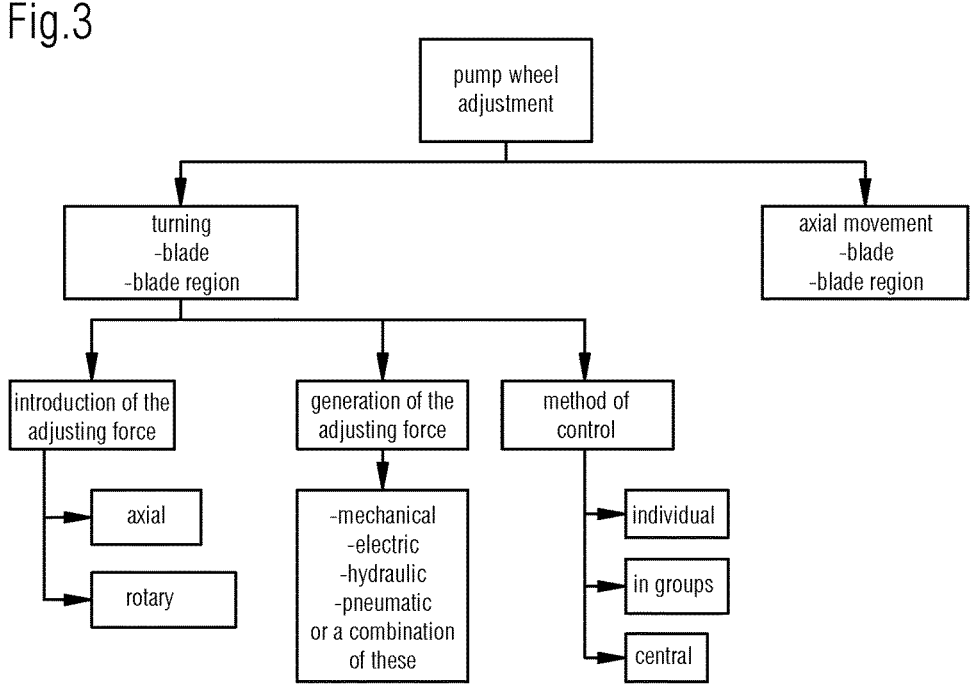
FIG. 3 shows an overview of possible methods of adjustment.

It is possible fundamentally to distinguish between two basic types for the adjustment of individual blade regions or blade parts or entire blades. The methods of adjustment shown in FIG. 3 are indicated for the pump blade wheel. They also apply to a possible adjustment system provided for bladed regions/adjustable blades on the turbine wheel.

A first basic type consists in the design of individual adjustable blades 13 and/or individual adjustable blade regions 14 as pivoted blades. That is to say that blade adjustment is accomplished by pivoting about a pivoting axis RS associated with the individual adjustable blade 13 or the corresponding blade segment. This axis can be arranged centrically or eccentrically with respect to the central axis of a blade.

Another embodiment in accordance with the first basic type consists in the design of at least one individual blade with deformable regions.

A second basic type consists in the axial movability of individual adjustable blades 13 or blade segments 14, i.e. movability of the effective region of the individual blades out of the work circuit, preferably parallel to the axis of rotation R of the pump wheel 9.

Another embodiment (not shown here) in accordance with the second basic type consists in that at least some of the blades are designed to be longer in the axial direction than other blades, or all the blades are characterized by an extended design, with the result that a differently profiled region enters the region of incident flow when moved in the axial direction.

As regards their common features, the individual actuating devices 15 can be collected into groups, wherein each group is characterized by the introduction of the adjusting force, in particular the direction of introduction of the adjusting force and the method of generation of the adjusting force and the control of the individual blades. These individual groups are shown using a tabular list in FIG. 3 as an example. They can comprise a multiplicity of individual variants that can be associated with this group.

The actuating device 15 comprises an actuator 17, which is connected to the adjustable blade 13 and/or the adjustable blade segment 14 by a transmission mechanism 19.

As regards the generation of the adjusting force F itself, there is a large number of possibilities. These can be implemented in accordance with one possibility from the group mentioned below or with a combination of these:
mechanical
hydraulic
pneumatic
electric In all the embodiments, the position of the pump wheel 9 in the blade space is fixed. However, the adjustability of one or more blades or blade regions is variable.

In the embodiment of the converter 2 as a counterrotating converter 16, the shaft end is accessible on the input side, but only restricted access is available on the output side.

Figure 4A:
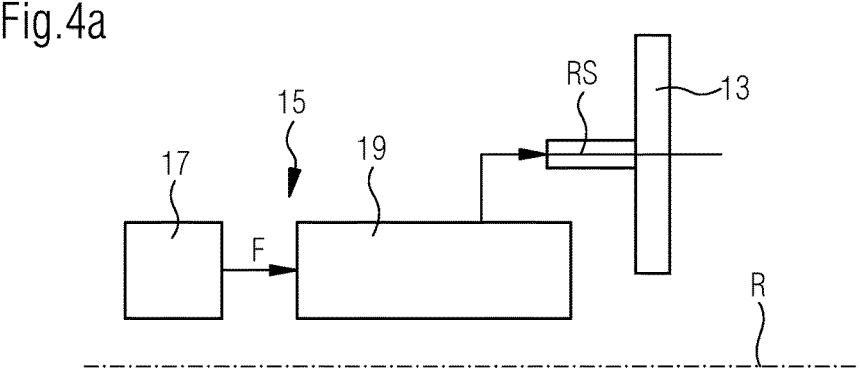
FIGS. 4a and 4b illustrate possibilities for the introduction of the adjusting force in a schematically simplified illustration.
Figure 4B:
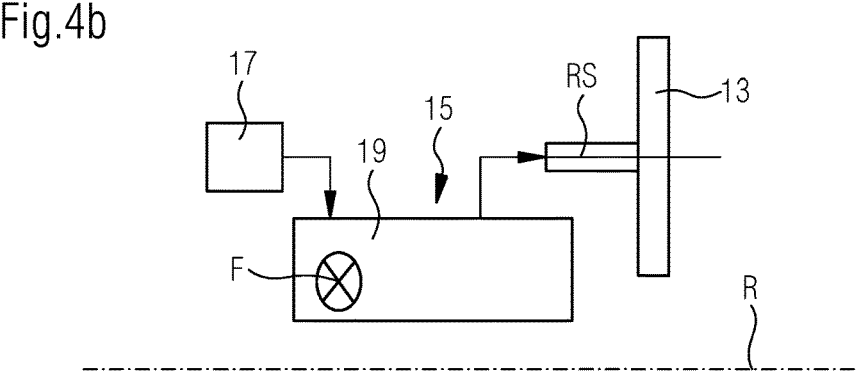

FIGS. 4a and 4b illustrate, in schematically simplified form, the two possibilities for introducing the adjusting force F for an embodiment of a blade 13 as a pivoted blade, which is mounted pivotably in the shell accommodating the blades.

FIG. 4a illustrates the axial introduction of the adjusting force F, i.e. parallel in direction to the axis of rotation R of the pump wheel 9. The adjusting force F is transmitted to the blade 13 by at least one transmission mechanism 19 of the actuating device 15 with the purpose of implementing a change in the direction of the force. Here, the transmission mechanism 17 can be coupled either directly or via further interposed elements either to a component that describes the pivoting axis RS of the blade 13 or to a blade region, eccentrically with respect to the blade, in order to generate a torque about the pivoting axis RS.

In contrast, FIG. 4b shows schematically, in simplified form, the rotary introduction of the adjusting force F, i.e. in the circumferential direction about the axis of rotation R of the pump wheel 9.

FIGS. 5 and 6 illustrate advantageous design embodiments of possible actuating devices 15 for pivoted blades, wherein here all the blades of the blading of a pump wheel 9 are preferably adjusted in the same way. The adjustment of all the adjustable blades coupled to the actuating device 15 takes place simultaneously by the same pivoting angle.

For this purpose, the individual blade 13 of blading 12 of the pump wheel 9 is mounted so as to be pivotable about a pivoting axis RS. The pivoting axis RS can be arranged centrically or eccentrically relative to the extent of the blade between the radially inside and outside diameter of the pump wheel 9.

Figure 5A:
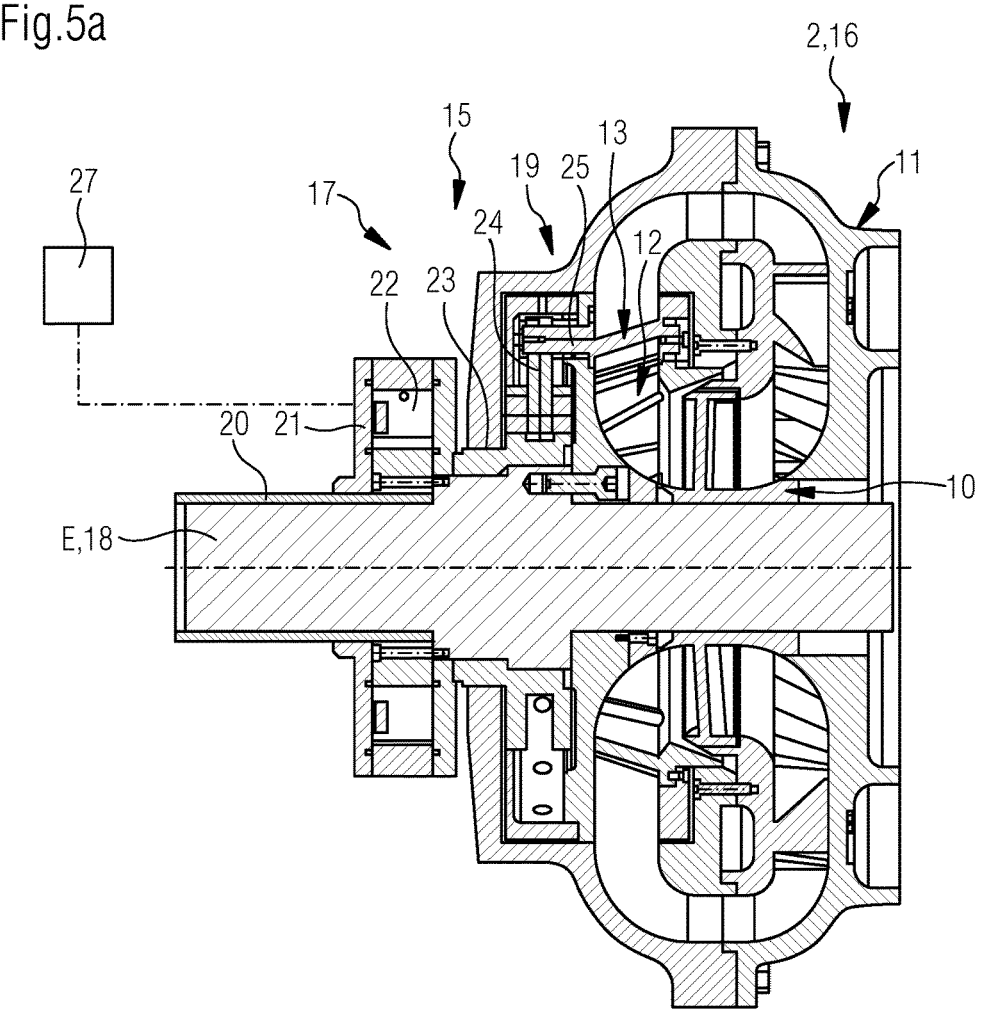
FIGS. 5a and 5b show, by way of example, using various views of a converter, the possibility of a pump wheel adjuster as a rotary vane actuator.

In this case, the individual blade 13 is mounted for conjoint rotation in the pump wheel shell by means of a pivot or journal situated on this theoretical axis RS. The actuator 17 according to FIG. 5a is formed by an annular piston. This has ring elements 20 and 21, which are each arranged coaxially with respect to the axis of rotation R of the pump wheel 9, wherein a first ring element 21 is connected to the at least one adjustable blade 13 and/or the at least one adjustable blade segment 14 in order to transmit an actuating force or an actuating torque by means of the transmission mechanism 19, and the first ring element 21 can be turned relative to a second ring element 20 in the circumferential direction of the drive shaft. The first and the second ring element 20, 21 form at least two pressure chambers 22, which are arranged in the circumferential direction of the drive shaft and can each be subjected to pressure for the relative rotation between the first and second ring element 20, 21.

The transmission mechanism 19 has an adjusting ring 23, which is arranged coaxially with respect to the drive shaft 18 or input E and is connected for conjoint rotation to the first ring element, wherein the adjusting ring 23 is coupled to the at least one adjustable blade 13 for the transmission of an actuating force or of an actuating torque, and the adjusting ring 23 has at least one cam, which interacts with a crank mechanism, in particular with a radially arranged lever element 24, wherein the crank mechanism is coupled to the adjustable blade 13.

Figure 5B:
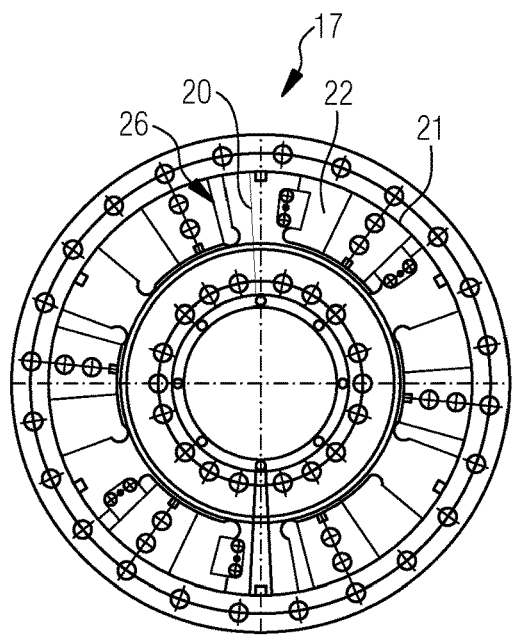

FIG. 5*b* shows a cross section of the two mounted ring elements 20, 21, from which the annular space and the internal fittings arranged therein can be seen. The two ring elements each have radially arranged vanes, which act as rotary vanes by virtue of the relative rotation between the first and the second ring element. Pressure chambers 22, 26, the volume of which can be varied by means of the position of the respective vane, are formed between the vanes of the two ring elements 20, 21. The setting or angular position of the pivoted blades can be set by means of the position of the ring elements 20, 21 relative to one another.

Figure 6A:
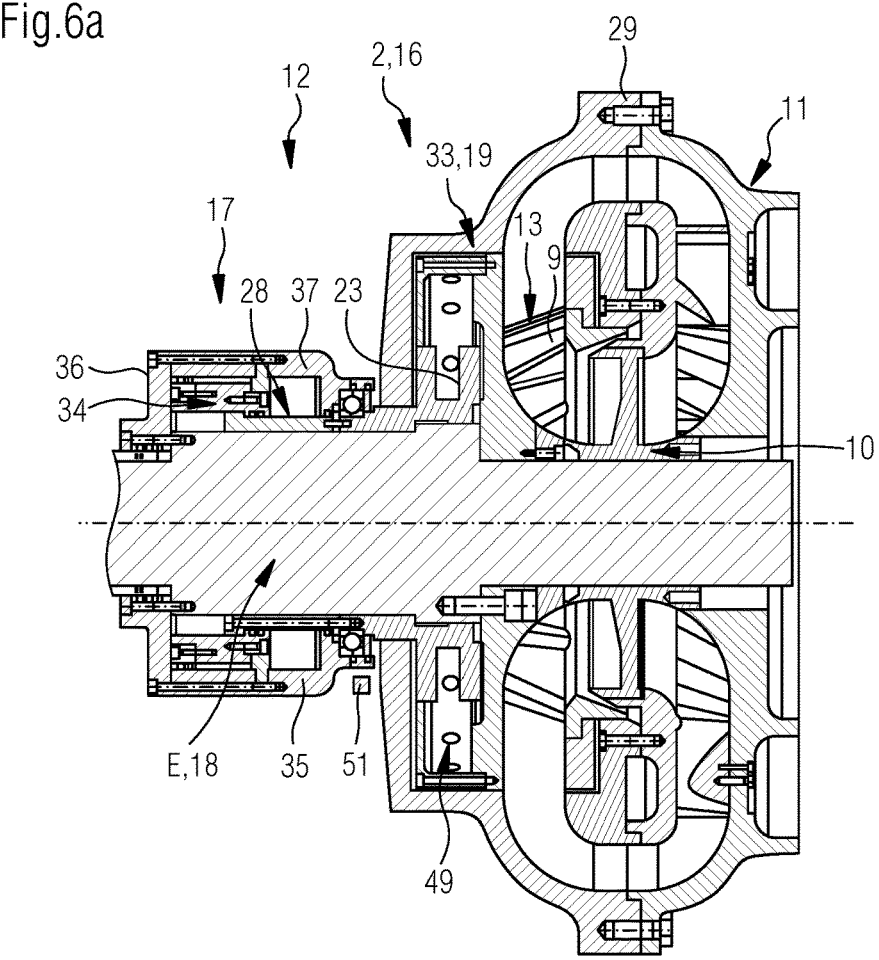
FIGS. 6a and 6b show, by way of example, using various views of a converter, the possibility of a pump wheel adjuster with axial introduction of the adjusting force.

In contrast, FIG. 6*a* shows an embodiment with axial introduction of the adjusting force into the transmission mechanism 19 in an axial section. The actuator comprises at least one actuating piston 28, which can be moved in the axial direction and is arranged coaxially or eccentrically with respect to the axis of rotation R of the pump wheel 9, wherein the actuating piston 28 is connected to the at least one adjustable blade 13 and/or the at least one adjustable blade segment 14 in order to transmit an actuating force or an actuating torque by means of the transmission mechanism 19 and can be moved in the axial direction relative to the pump wheel 9. The transmission mechanism comprises an adjusting ring 23, which is in engagement with a thread of the actuating piston 28 by means of a thread, wherein an axial motion of the actuating piston 28 is converted into a turning motion at the adjusting ring 23. The adjusting ring 23 is coupled in the end region remote from the actuating piston 28 to the adjustable blade 13, in particular to an element, in particular a crank mechanism 49, which describes the pivoting axis RS and carries the adjustable blade 13.

To be specific, the converter illustrated by way of example in FIG. 6*a* is a single-phase counterrotating converter having a pump wheel 9, a turbine wheel 10 and a stator 11. In the counterrotating converter shown, the pump wheel 9 and the turbine wheel 10 rotate in opposite directions. The stator 11 is connected in a fixed manner to the stator housing 29 (single-phase converter). In the illustrative embodiment according to FIG. 6*a*, the stator 11 forms a reversing stator, which is arranged between the pump wheel 9 and the turbine wheel 10. The following description of adjustment applies generally in connection with a hydrodynamic converter, i.e. it can also be applied in the case of multistage counterrotating converters or corotating converters, in which the pump wheel 9 and the turbine wheel 10 rotate in the same direction. It is also conceivable to employ this type of adjustability in the case of multiphase hydrodynamic converters, in which single-stage or multistage designs are likewise possible once again.

To be specific, the converter 2 shown in FIG. 6*a* has a working space, through which an operating medium can flow. The converter 2 has a pump wheel 9, which is connected to a drive shaft 18 or input shaft E, and a turbine wheel 10, which is connected to a driven shaft (not shown). The turbine wheel 10 is mounted for relative rotation on the drive shaft 18. In the illustrative embodiment according to FIG. 6*a*, the stator housing 29 with the stator 11 is arranged in a fixed manner. Together with the housing of the turbine wheel 10 and with the housing of the pump wheel 9, the stator housing 29 forms a working space which is enclosed in the form of a shell and in which the flow circuit forms during operation.

The pump wheel 9 is connected for conjoint rotation to the drive shaft 18. For this purpose, a shaft shoulder is formed in the drive shaft 18, and the pump wheel 9 can be screwed to said shoulder, in this case axially by way of example. Other shaft-hub connections are possible.

The pump wheel 9 has at least one adjustable blade 13. The other pump blades of the pump wheel 9 can likewise be designed in a corresponding manner as adjustable blades 13. As an alternative, the remaining pump blades can be of rigid design. The adjustable blade 13 is assigned an actuating device 15, which rotates with the pump wheel 9 during the operation of the converter 2. The actuating device 15 has a deflection device 33 and a sleeve 28 corresponding to the actuating piston, a sliding element 34 and an outer cylinder 35. The deflection device 33 couples the sleeve 28, the sliding element 34 and the outer cylinder 35 to the adjustable blade 13. The sleeve 28, the sliding element 34 and the outer cylinder 35 are each arranged coaxially with respect to the drive shaft 18. The sleeve 28, the sliding element 34 and the outer cylinder 35 are arranged concentrically (see also FIG. 6*b*).

The sleeve 28 can be turned relative to the outer cylinder 35 and to the drive shaft 18 in the circumferential direction of the drive shaft 18. The turning movements of the sleeve 28 actuate the deflection device 33, which transmits the turning motion of the sleeve 28 to the adjustable blade 13 and changes the angle of attack of the adjustable blade 13.

To be specific, the outer cylinder 35 in the illustrative embodiment according to FIG. 6*a* is arranged on the outside and connected for conjoint rotation to the drive shaft 18. This can be accomplished, for example, by screwing the outer cylinder 35 axially to a shaft shoulder of the drive shaft 18. The outer cylinder 35 rotates with the drive shaft 18. The rotatably mounted outer cylinder 35 forms a cylindrical housing which encloses the sliding element 34 and the sleeve 28. In other words, the sliding element 34 and the sleeve 28 are arranged in the housing of the outer cylinder 35. For this purpose, the outer cylinder 35 has a first end wall 36, which is arranged on the outside in the axial direction, is seated directly on the drive shaft 18 and is screwed to the shaft shoulder, as described above. Moreover, the outer cylinder 35 has a second end wall 37, which is arranged on the inside in the axial direction and delimits the housing in the axial direction. The housing has an outer ring 38, which delimits the housing in the radial direction and is arranged between the two end walls 36, 37. The counterpart to the outer ring 38 is formed by the inner ring of the sleeve 28. As can be seen in FIG. 6*a*, the two end walls 36, 37 fit over the outer ring 38 and the inner ring in such a way that two annular spaces 41, 42 are formed between the outer cylinder 35 and the sleeve 28. The annular spaces 41, 42 are arranged axially in series and are separated pressure-tightly from one another by the sliding element 34. The annular spaces 41, 42 act as an adjustment space. The first end wall 36 forms a sealing surface with respect to the outer circumference of the drive shaft 18.

Figure 6B:
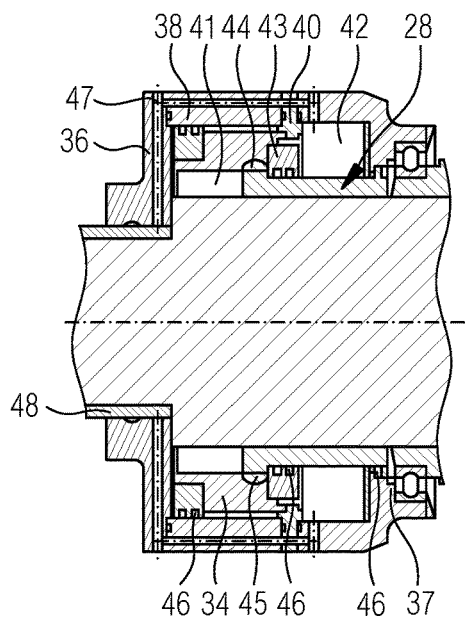

FIG. 6*b* shows a cross section through the sleeve 28, the sliding element 34 and the outer cylinder 35, from which the adjustment space and the internal fittings arranged therein can be seen. The outer cylinder 35 has an internal thread 40, which is arranged on the inner circumference of the outer cylinder 35. To be specific, the internal thread 40 forms a nut thread, which is screwed to the outer cylinder 35. The internal thread 40 is in engagement with a corresponding external thread 43 on the sliding element 34.

The sleeve 28 has an external thread 44, which engages in a corresponding internal thread 45 on the sliding element 34.

With this arrangement, a relative rotation between the outer cylinder 35 and the sleeve 28 is produced by the superimposed translational/rotary motion of the sliding element 34.

Pressure chambers 41, 42, which are separated from one another by the sliding element 34, are formed between the first end wall 36 and the second end wall 37 of the outer cylinder 35. The volume of the pressure chambers 41, 42 can be varied by means of the position of the sliding element 34. In other words, the clearance of the sliding element 34 in the axial direction can be varied by moving the sliding element 34.

In each case the first end wall 36 of the outer cylinder 35, the outer cylinder 35, the sleeve 28, the drive shaft 18 and the sliding element 34 together delimit a first pressure chamber 41. For this purpose, the first end wall 36 of the outer cylinder 35 rests sealingly on the drive shaft 18 and on the outer ring 38 of the outer cylinder 35. The same applies to sliding element 34 in a corresponding manner, which rests sealingly on the outer cylinder 35 and on the sleeve 28. For this purpose, sealing elements 46 are provided. Overall, a closed pressure chamber 41 is thereby formed, which is delimited in the axial direction by the first end wall 36 and the sliding element 34 and in the radial direction by the outer ring 38 of the outer cylinder 35 and by the drive shaft 18 and the inner ring 39.

In the axial direction of the drive shaft 18, a further pressure chamber 42 is formed, which is delimited in a corresponding manner by the second end wall 37, the outer cylinder 35, the sleeve 28 and the sliding element 34 and sealed off by sealing elements 46. In other words, a sliding element 34 is arranged between the first end wall 36 and the second end wall 37 of the outer cylinder 25, with the result that a respective pressure space 41, 42 is formed on each side of the sliding element 34.

To produce the axial movement of the sliding element 34 along the drive shaft 18 between the first end wall 36 and the second end wall 37 of the outer cylinder 35, the pressure chambers 41, 42 can each be subjected to pressure. By virtue of the axial movement of the sliding element 34, a superimposed rotary motion is simultaneously produced owing to the threaded joint between the outer cylinder 35 and the sliding element 34, bringing about a relative rotation of the sleeve 28 in the circumferential direction of the drive shaft 18.

In the illustrative embodiment according to FIG. 6b, the pressure is produced hydraulically. In the operating state shown in FIG. 6b, there is a lower pressure prevailing in the first pressure chamber 41 than in the second pressure chamber 42, with the result that the sliding element 34 and hence the sleeve 28 is turned clockwise. By changing the pressure ratios in the two pressure chambers 41, 42, a counterclockwise adjustment of the sleeve 28 is possible.

In the detail illustration according to FIG. 6b, further details of the actuating device 15 can furthermore be seen. Thus, for example, it can be seen from FIG. 6b that bores 47 are formed in the outer cylinder 35, said bores acting as pressure channels for the supply of the hydraulic fluid. To be specific, the pressure channels are formed in the outer cylinder 35 and extend radially outward through the first end wall 36. The bores 47 open into the respective pressure chambers 41, 42 in the region of the outside diameter of the pressure chambers 41, 42. As a result, the hydraulic fluid can be forced radially inward into the pressure chambers 41, 42 via the outer cylinder 35. A scavenging effect is achieved, by means of which accumulation of contaminants on the outer ring 38 is largely prevented.

The feed channels which connect the bores 47 of the outer cylinder 35 to a feed device (not shown) are formed directly in the drive shaft 18 or in a component associated with the drive shaft 18, e.g. by a rotary union. To be specific, a hydraulic sleeve 48, in which the feed channels for supplying the pressure chambers 41, 42 with hydraulic fluid are formed, is arranged between the outer cylinder 35 and the drive shaft 18. The connection between the outer cylinder 35 and the hydraulic sleeve 48 can be made nonpositively, for example.

To transmit the rotary motion of the sleeve 28 to the adjustable blade 13, the deflection device 33 described below is provided. The deflection device 33 is connected for conjoint rotation to the sleeve 28. As a result, it is possible to introduce a torque into the deflection device 33, which is transmitted to the adjustable blade 13. Transmission by the deflection device 33 can be accomplished by a superimposed translational/rotary motion or by an exclusively rotary motion. The torque introduced by the sleeve 28 imparts a pivoting motion to the adjustable blade 13, as a result of which the angle of attack of the adjustable blade 13 is changed.

To be specific, the deflection device 33 has an adjusting ring 23 for this purpose, said ring being arranged coaxially. The adjusting ring 23 is seated on the outside diameter of the drive shaft 18 and can be rotated relative to the latter. The adjusting ring 23 is supported in the axial direction on the housing of the pump wheel 9, for example. In this case, the adjusting ring 23 is connected for conjoint rotation to the sleeve 28. The connection can be made materially (welded joint) or positively or nonpositively, for example. An integral design is also conceivable. The action of the connection consists in taking the adjusting ring 23 along during a rotation of the sleeve 28.

The adjusting ring 23 has a driver on the end arranged axially on the inside, said driver interacting with a crank mechanism 49. The crank mechanism 49 is coupled to the adjustable blade 13. To be specific, a pin 50 is secured on the lower end of the crank mechanism 49. The pivoting axis of the pin 50 extends parallel to the central axis of the drive shaft 18. The upper end of the crank mechanism 49 engages on the adjustable blade 13, specifically on an eccentrically arranged journal of the adjustable blade 13, which projects axially from the housing of the pump wheel 9.

Together with the pin, the driver forms a pivot joint, about which the crank mechanism 49 can be pivoted. The pivoting motion takes place in the circumferential direction of the drive shaft 18. The driver acts as a sliding bearing in which the pin is arranged with the ability for rotary motion. The adjusting torque introduced by the adjusting ring 23 is transmitted to the crank mechanism 49 via the pin, which is supported in the driver of the adjusting ring 23. The crank mechanism 49 converts the rotary motion of the adjusting ring 23 into a superimposed translational/rotary motion of the crank mechanism 49, which brings about a tilting motion of the adjustable blade 13, thus allowing the desired angle of attack of the adjustable blade 13 to be set.

An alternative way of transmitting the rotary movements of the sleeve 28 to the adjustable blade 13 can be achieved by means of external toothing, which is formed on the axially inner end of the adjusting ring 23. To be specific, the axially inner end of the adjusting ring 23 can form a gearwheel or gearwheel segment, which meshes with corresponding external toothing on a journal of the adjustable blade 13. The journal extends parallel to the central axis of the adjusting ring 23. Other mechanical couplings of the adjusting ring 23 to the adjustable blade 13 are possible. The adjustable blade 13 can likewise form a pivoted blade, as shown in FIG. 6*a*, which is pivoted as a whole. As an alternative, the blade 13 can be a multi-element blade 13 which has at least one adjustable pivoted segment.

As shown in FIG. 6*a*, the converter has a sensor 51 for detecting the angular position between the sleeve 28 and the outer cylinder 35. The sensor 51 allows closed-loop control of the input power of the pump wheel.

In summary, the converter according to FIG. 1 operates as follows:

To adjust the blading of the pump wheel 9, the actuating device 15 is actuated. For this purpose, the pressure chambers 41, 42 are subjected to different pressures, with the result that the sliding element 34 is moved axially along the drive shaft 18 and turned by the internal thread 40. Since the sliding element 34 is in mesh with the sleeve 28, the sleeve 28 is turned relative to the outer cylinder 35 in the circumferential direction, being turned mechanically or, if the actuation of the sliding element 34 is taken into account, indirectly by hydraulic means. Through the rotary motion of the sleeve 28, the adjusting ring 23 is turned in the circumferential direction, as a result of which the crank mechanism 49 is actuated. The crank mechanism 49 converts the rotary motion of the adjusting ring 23 into a superimposed translational/rotary motion, which brings about a tilting motion of the adjustable blade 13, thus allowing the desired angle of attack of the adjustable blade 13 to be set. The position of the adjustable blade 13 is held by means of the pressure ratios in the pressure chambers 41, 42.

The sets of teeth between the sliding element and the sleeve and between the sliding element and the outer cylinder are preferably embodied as helical toothing for superimposition in the mode of action thereof when turned.

The possibilities of blade adjustment described in the figures are described for the pump wheel. These can also be employed for the turbine wheel.

REFERENCE SIGNS

1 power transmission device
2 hydrodynamic speed/torque converter
3 superposition gear unit
4 planetary gear unit
5 annulus
6 sun wheel
7 planet wheels
8 spider, planet carrier
9 pump wheel (converter)
10 turbine wheel (converter)
11 stator
12 blading
13 adjustable blade
14 blade segment
15 actuating device
16 counterrotating converter
17 actuator
19 transmission mechanism
20 ring element
21 ring element
22 pressure chamber
23 adjusting ring
26 pressure chamber
24 lever element
28 actuating piston
29 stator housing
30 idler wheel
31 drive unit
32 work machine
33 deflection device
34 sliding element
35 outer cylinder
36 first end wall
37 second end wall
38 outer ring
39 inner ring
40 internal thread
41 annular space
42 annular space
43 external thread
44 external toothing
45 internal toothing
46 sealing element
47 bore
48 hydraulic sleeve
49 crank mechanism
50 pin
51 sensor
A output shaft
E input shaft
F adjusting force
RS pivoting axis
R axis of rotation

The invention claimed is:

1. A transmission device for connecting an input shaft, which is connected at least indirectly to a drive unit, to an output shaft, which is connected at least indirectly to a work machine, the device comprising:
a hydrodynamic converter formed with a working space to be filled with an operating medium and having at least one pump wheel disposed for rotation in a pump wheel shell, at least one turbine wheel and at least one stator with blading;
a superposition gear unit including at least one planetary gear unit, said at least one planetary gear unit having first, second and third elements including an annulus wheel, a sun wheel and a planet carrier with a plurality of planet wheels;
wherein one or both of said at least one pump wheel or the input shaft is coupled to said first element of said planetary gear unit, said second element of said planetary gear unit is coupled at least indirectly to said at least one turbine wheel, and the output shaft is connected to said third element of said planetary gear unit;
wherein said blading of said pump wheel has at least one adjustable blade and/or at least one multi-element blade with at least one adjustable blade segment;
an actuating device for actuating said at least one adjustable blade or adjustable blade segment, said actuating device including an actuator disposed axially outside said pump shell and a transmission mechanism connecting said actuator to said adjustable blade or at least one adjustable blade segment of said multi-element blade inside said pump wheel shell, wherein an adjusting force applied by said actuator is introduced into said transmission mechanism in accordance with one of the following possibilities or with a combination thereof:
- in an axial direction, based on an axis of rotation of said pump wheel or said turbine wheel;
- in a circumferential direction, about the axis of rotation of said pump wheel or said turbine wheel; and said actuator being a single actuator having ring elements, which are arranged axially outside said pump wheel shell and coaxially with respect to the axis of rotation of said pump wheel, wherein a first ring element of said ring elements is connected to said at least one adjustable blade and/or at least one adjustable blade segment to transmit an actuating force or an actuating torque by way of said transmission mechanism, and said first ring element is rotatable relative to a second ring element of said ring elements in a circumferential direction of said input shaft.

2. The device according to claim 1, configured for power transmission from the drive unit to the work machine, wherein the drive unit is a constant speed drive unit and the work machine is a variable speed work machine.

3. The transmission device according to claim 1, wherein said superposition gear unit comprises precisely one planetary gear unit.

4. The transmission device according to claim 1, wherein said hydrodynamic converter is a co-rotating converter.

5. The transmission device according to claim 1, wherein said hydrodynamic converter is a counter-rotating converter.

6. The transmission device according to claim 1, wherein said first element of said planetary gear unit is said annulus wheel, said second element of said planetary gear unit is said planet carrier and said third element of said planetary gear unit is said sun wheel, and said turbine wheel is connected to said planet carrier either directly or via a reversing mechanism.

7. The transmission device according to claim 1, wherein said first element of said planetary gear unit is said annulus, said second element of said planetary gear unit is said sun wheel and said third element of said planetary gear unit is said planet carrier.

8. The transmission device according to claim 1, wherein said first element of said planetary gear unit is said sun wheel, said second element of said planetary gear unit is said annulus and said third element of said planetary gear unit is said planet carrier.

9. The transmission device according to claim 1, wherein said first element of said planetary gear unit is said sun wheel, said second element of said planetary gear unit is said planet carrier and said third element of said planetary gear unit is said annulus.

10. The transmission device according to claim 1, wherein said first element of said planetary gear unit is said planet carrier, said second element of said planetary gear unit is said annulus and said third element of said planetary gear unit is said sun wheel.

11. The transmission device according to claim 5, wherein said first element of said planetary gear unit is said planet carrier, said second element of said planetary gear unit is said sun wheel and said third element of said planetary gear unit is said annulus.

12. The transmission device according to claim 1, wherein said first element of said planetary gear unit is said planet carrier, said second element of said planetary gear unit is said sun wheel and said third element of said planetary gear unit is said annulus.

13. The transmission device according to claim 12, which comprises a hollow shaft connecting said turbine wheel to said sun wheel, and wherein said input shaft, which passes through said hollow shaft, is connected to said planet carrier on a side of said planetary gear unit averted from said hydrodynamic converter.

14. The transmission device according to claim 12, wherein said annulus is connected at least indirectly to said output shaft on a side of said planetary gear unit averted from said hydrodynamic converter.

15. The transmission device according to claim 1, wherein at least one of said pump wheel or said turbine wheel comprises a blade-wheel shell, and said at least one adjustable blade or said at least one adjustable blade segment of said multi-element blade is pivotally mounted in said blade-wheel shell to be pivotable about a theoretical axis.

16. The transmission device according to claim 15, wherein said actuating device is arranged outside said working space and adjacent a blade wheel in an axial direction, the blade wheel being said pump wheel or said turbine wheel.

17. The transmission device according to claim 1, wherein:
- at least one of said pump wheel or said turbine wheel comprises a blade-wheel shell, and said at least one adjustable blade or said at least one adjustable blade segment of said multi-element blade is pivotally mounted in said blade-wheel shell to be pivotable about a theoretical axis; and
- said actuating device is arranged outside said working space and adjacent a blade wheel in an axial direction, the blade wheel being said pump wheel or said turbine wheel.

18. The transmission device according to claim 11, wherein:
- at least one of said pump wheel or said turbine wheel comprises a blade-wheel shell, and said at least one adjustable blade or said at least one adjustable blade segment of said multi-element blade is pivotally mounted in said blade-wheel shell to be pivotable about a theoretical axis; and
- said actuating device is arranged outside said working space and adjacent a blade wheel in an axial direction, the blade wheel being said pump wheel (9) or said turbine wheel.

19. The transmission device according to claim 18, wherein said actuating device is configured for adjusting a plurality of adjustable blades or adjustable blade segments in accordance with one of the following options:
- individually;
- in groups; or
- all together.

20. The transmission device according to claim 1, wherein said actuating device is configured for adjusting a plurality of adjustable blades or adjustable blade segments in accordance with one of the following options:
- individually;
- in groups; or
- all together.

21. The transmission device according to claim 1, wherein said actuator is a single actuator or a combination selected from the group of actuators consisting of a mechanical actuator, an hydraulic actuator, a pneumatic actuator, and an electronic actuator.

22. The transmission device according to claim 1, wherein said first and second ring elements form at least two pressure chambers, which are arranged in the circumferential direction of said input shaft and which can each be subjected to pressure for a relative rotation between said first and second ring elements.

23. The transmission device according to claim 1, wherein said transmission mechanism has an adjusting ring, which is arranged coaxially with respect to said input shaft and which is connected for conjoint rotation to said first ring element, wherein said adjusting ring is coupled to said at least one adjustable blade for transmitting an actuating force or an actuating torque, and said adjusting ring is selected from the group consisting of the following:

said adjusting ring having at least one cam, which interacts with a crank mechanism that is coupled to said adjustable blade;

said adjusting ring having external toothing, which meshes with external toothing of a journal of said adjustable blade, which extends parallel to a central axis of said adjusting ring.

24. The transmission device according to claim 1, wherein the drive unit is an electric motor.

25. The transmission device according to claim 1, wherein the work machine is a delivery device for a fluid.

26. The transmission device according to claim 1, wherein said stator comprises at least one adjustable blade to be actuated by an actuating device and/or at least one multi-element blade having at least one adjustable blade segment.

* * * * *